ize: 100%">United States Patent [19]

Malinge et al.

[11] Patent Number: 4,764,578
[45] Date of Patent: Aug. 16, 1988

[54] COMPOSITIONS OF POLYARYLOXYPYRIDINE OLIGOMERS WITH PHTHALONITRILE END GROUPS, THEIR PREPARATION AND USE FOR MANUFACTURING POLYARYLOXYPYRIDINE CO-PHTHALOCYANINE LATTICES

[75] Inventors: Jean Malinge, Givors; Guy Rabilloud, Grenoble; Bernard Sillion, Lyons, all of France

[73] Assignee: Centre d'Etude des Materiaux Organiques pour Technologies Avancees, Vernaison, France

[21] Appl. No.: 907,905

[22] Filed: Sep. 16, 1986

[30] Foreign Application Priority Data

Sep. 16, 1985 [FR] France ................................ 85 13793

[51] Int. Cl.⁴ ........................ C08G 83/00; C08G 73/00
[52] U.S. Cl. ...................................... 528/27; 528/211; 528/172; 528/128
[58] Field of Search ................. 528/211, 172, 27, 128

[56] References Cited

U.S. PATENT DOCUMENTS

| 3,716,549 | 2/1973 | Darsow | 528/185 |
| 4,234,712 | 11/1980 | Keller | 528/271 |
| 4,259,471 | 3/1981 | Keller | 528/271 |
| 4,408,035 | 10/1983 | Keller | 528/172 |
| 4,409,382 | 10/1983 | Keller | 528/172 |
| 4,410,676 | 10/1983 | Keller | 528/172 |
| 4,587,325 | 5/1986 | Keller | 528/211 |
| 4,645,821 | 2/1987 | Malinge et al. | 528/331 |

Primary Examiner—Harold D. Anderson
Assistant Examiner—Frederick Krass
Attorney, Agent, or Firm—Millen & White

[57] ABSTRACT

The disclosed compositions of polyaryloxypyridine oligomers with phthalonitrile end groups are obtained by formation of a composition of polyaryloxypyridine oligomers with alkali phenolate end groups, followed with the reaction of said composition with 4-nitrophthalonitrile. Their average polycondensation degree may range from 1 to 50. They can be used in combination with a co-reactant derived from benzhydrol and containing one or two ortho-dinitrile functional groups, to constitute polyaryloxypyridine co-polyphthalocyanine lattices.

15 Claims, No Drawings

COMPOSITIONS OF POLYARYLOXYPYRIDINE OLIGOMERS WITH PHTHALONITRILE END GROUPS, THEIR PREPARATION AND USE FOR MANUFACTURING POLYARYLOXYPYRIDINE CO-PHTHALOCYANINE LATTICES

The present invention concerns new compositions of polyaryloxypyridine oligomers ending with phthalonitrile functional groups. It also concerns the copolymerization of these compositions in the presence of one or more chemical compounds derived from benzhydrol and carrying one or more ortho-dinitrile groups.

The invention also concerns cross-linked lattices of polyaryloxypyridine co-polypthalocyanines formed during the reactions of cyano-addition of ortho-dinitrile and phthalonitrile groups.

The compositions consisting essentially of polyaryloxypyridine $\alpha$, $\omega$-bis(phthalonitrile), according to the invention, can be used as binders for manufacturing composite materials, as adhesives, coating varnishes and as raw materials for manufacturing molded articles and cellular materials.

BACKGROUND OF THE INVENTION

The search for new thermostable polymers, thermosetting by addition reactions not releasing volatile compounds during the operation, gives rise to an increased interest in the manufacture of dense, homogeneous materials of low porosity.

To attain this object, cyano-addition reactions have already been used to cross-link fusible and soluble monomers or oligomers. As a matter of fact, these reactions occur upon mere heating of the reactants at the operating time.

Such cyano-addition reactions have been disclosed with aromatic, aliphatic or arylaliphatic compounds containing amide, imine, ether, sulfone, ketone and imide linkages. These reactions have been disclosed, for example, in the papers of Walton and Griffith, Applied Polymer Symposium, 1975,26,429, Polymer Science and Technology, 1975, 98, 665, and A.C.S. Division of Organic coatings and Plastic Chemistry, 1978 38, 596; of Keller and coll., SAMPE Quarterly, July 1981, p.1; and of Marullo and Snow, A.C.S. Symposium Series, 1982, vol.195, p.325.

Other examples of these reactions are given in U.S. Pat. Nos. 3,890,274, 3,996,196, 4,056,560, 4,057,569, 4,102,873, 4,116,945, 4,136,107, 4,209,458, 4,223,123, 4,234,712, and 4,238,601 and in the French patent application No. 2,568,257. From these works it appears that several problems remain unsolved concerning the operating conditions, the impact strength and the polymerization conditions.

For the operating conditions, the difficulties result mainly from the fact that the utilized products have melting or softening temperatures of at least 200° C.

The impact strength of the finished products is generally rather low since the size of the segments between the end recurring units of phthalonitrile type is voluntarily reduced to keep the melting temperature as low as possible. It has been recently suggested in U.S. Pat. No. 4,409,382 to use flexibilizing segments essentially consisting of polyether-sulfone at variable polycondensation degrees in order to improve the impact strength.

For the polymerization conditions, it is known that the reaction of the phthalonitrile groups is very slow in the absence of metals or metal salts and that it is not very selective. For avoiding the use of metal compounds, Marullo and Snow (see above mentioned reference) and U.S. Pat. Nos. 4,408,035 and 4,410,676 have recommended conducting the polymerization reaction in the presence of phenols or of primary amines.

Under these conditions the gelation time is considerably shortened and the polymerization temperatures are lower. However, the structure of the so-formed polymers is not well defined and the by-products resulting from the conversion of these additives remain in the final material as unstable small molecules.

The above-mentioned French patent application discloses a new method for converting phthalonitrile groups to phthalocyanine macrorings having a very good thermal stability. This reaction has been observed on polyimide oligomers ending with ortho-dinitrile functional groups containing, in their macromolecule chain, aromatic rings interconnected with secondary alcohol (-CHOH-) groups. It has been shown that the formation of polyimide co-polyphthalocyanine lattices in these oligomers is inducted by an intramolecular oxidation-reduction of the benzhydrol groups.

The compositions mentioned in this patent application have excellent thermal properties but, for many applications, their melting temperature is too high and the operating conditions too severe.

OBJECT OF THE INVENTION

One object of the invention is to provide new compositions containing phthalonitrile groups characterized by: a relatively short gelation time at a temperature preferably lower than 250° C., easier conditions of use as compared with resins known in the prior art and the obtaining of finished products having good thermal and mechanical properties.

SUMMARY OF THE INVENTION

The present invention concerns more particularly the synthesis of new compositions of polyaryloxypyridine oligomers ending with phthalonitrile groups. These oligomers are highly soluble in many organic solvents and their melting temperature is of particular interest in many applications.

The invention also concerns a process of cross-linking these oligomers by cyano-addition reactions, performed in the presence of a co-reactant derived from benzhydrol, carrying one or more ortho-dinitrile groups. The cross-linked products, mainly formed of polyaryloxypyridine co-polyphthalocyanines obtained during the cyano-addition reactions, are also within the scope of the invention.

The invention relates more particularly to polyaryloxypyridine oligomers with phthalonitrile groups which may be represented by the general formula:

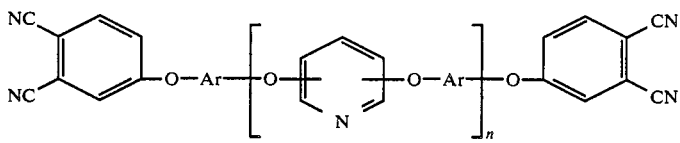

In this formula Ar is a divalent carbocyclic or heterocyclic aromatic radical, the two valences of which are on separated carbon atoms. Ar may be formed of one ring or several fused or interlinked rings, each ring comprising preferably 5 to 7 atoms, a part of which may consist of oxygen, sulfur and/or nitrogen atoms.

When Ar comprises several interlinked rings, the linking elements are, for example, a single bond or one of the following atoms and groups: —O—; —S—; —SO—; —SO$_2$—; —CH$_2$—; —C(CH$_3$)$_2$; —CO—; —CHOH—; —COO—CONH—; —Si(CH$_3$)$_2$—; —Si(CH$_3$)$_2$—O—Si(CH$_3$)$_2$—.

The linking elements may also consist of divalent hydrocarbon radicals, partially or completely fluorinated, of the aliphatic, arylaliphatic or cycloaliphatic type, preferably containing 1 to 10 carbon atoms.

Ether linkages between Ar radicals and the pyridine ring are placed in the middle of the latter to represent different isomers corresponding to bonds respectively fixed on different carbon atoms of pyridine.

Number n indicates the average polycondensation degree. Its value may range, for example, from 1 to 50; number n is not directly accessible but is an average value deduced from the respective molar proportions of the reactants used to prepare the compositions of polyaryloxypyridine oligomers.

The synthesis of compositions complying with the general formula (1) is generally performed by nucleophilic condensation between a composition of oligomers of polyaryloxypyridine with alkali phenolate end groups, which may be represented by the general formula:

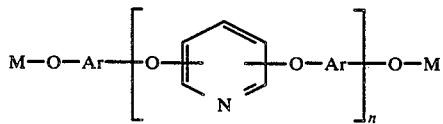

with 4-nitrophthalonitrile of formula:

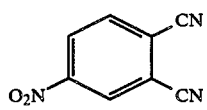

used in an amount corresponding to a number of nitrogroups equal to the number of available phenolate groups in the composition of formula (2), e.g., 1 to 1.5 nitro- group per phenolate group.

In these formulas, M is an atom of alkali metal, preferably sodium or potassium, and Ar is defined as above.

The composition of polyaryloxypyridine oligomers with phenolate end groups, of general formula (2), may be prepared by reacting a 2,6-dihalogenopyridine or a 2,4 dihalogenopyridine of formulas:

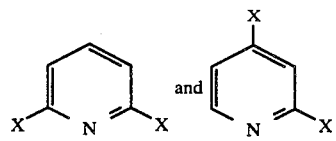

with an excess with respect to the molecular stoichiometry of at least one diphenolate of general formula:

M—O—Ar—O—M (5)

derived from the corresponding diphenol.

In these formulas, M and Ar have the same meaning as above and X is a halogen atom, preferably chlorine or bromine.

Examples of diphenols particularly convenient according to the invention are: 1,2 -dihydroxybenzene, 1,3-dihydroxybenzene, 1,4-dihydroxybenzene, dihydroxytoluenes, dihydroxyxylenes, dihydroxynaphthalenes, 2,2'-dihydroxybiphenyl, 3,3'-dihydroxybiphenyl, 4,4'-dihydroxybiphenyl, bis(3-hydroxyphenyl)methane, bis(4-hydroxyphenyl)methane, bis(3-hydroxyphenyl)ether, bis(4-hydroxyphenyl) ether, bis(3-hydroxyphenyl)sulfide, bis(4-hydroxyphenyl)sulfide, bis(3-hydroxyphenyl)sulfone, bis(4-hydroxyphenyl)sulfone, bis(3-hydroxyphenyl)sulfoxide, bis(4-hydroxyphenyl)sulfoxide, 3,3'-dihydroxybenzophenone, 4,4'-dihydroxybenzophenone, 2,2-bis (4-hydroxyphenyl)propane, 2,2-bis(4-hydroxyphenyl)1,1,1,3,3,3 hexafluoropropane, bis(3-hydroxyphenyl)dimethylsilane, bis(4-hydroxyphenyl)dimethylsilane, 1,3-bis(3-hydroxyphenyl)1,1,3,3-tetramethyldisiloxane, and 1,3-bis(4-hydroxyphenyl1,3-tetramethyl disiloxane.

Examples of dihalogenopyridine conveniently used, in particular, for carrying out the present invention are: 2,6-difluoropyridine, 2,6-dichloropyridine, 2,6-dibromopyridine, 2,6-diiodopyridine, 2,4-difluoropyridine, 2,4-dichloropyridine, 2,4-dibromopyridine and 2,4-diiodopyridine.

The compositions according to general formula (1) are prepared in several successive steps with or without separation of intermediary compounds.

One of the preferred operating manners consists of performing this synthesis in three successive steps in the same reactor, without separating the intermediary products.

In a first step, a diphenol is converted to alkali diphenolate of formula (5) by reaction with an alkali metal, an alkali metal hydroxide, carbonate or alcoholate. This reaction is performed according to well-known methods, preferably in solution in a polar organic solvent to which an aliphatic or aromatic hydrocarbon is added for removing the reaction water, if any, by azeotropic distillation. It is always preferable to maintain the reaction medium protected against moisture.

In a second step, dihalogenopyridine of formula (4) is added to diphenolate (5) in such molecular proportions as to always maintain an excess of the latter reactant. Thus the molar ratio of diphenolate (5) to dihalogenopyridine (4) is generally from 1.02/1 to 2/1, so as to obtain a composition of polyaryloxypyridine oligomers with phenolate end groups of general formula (2) having a convenient average polycondensation degree (n from 1 to 50). This condensation reaction, resulting in the formation of ether linkages, is performed by heating between 50° and 300° C., preferably from 90° to 250° C. It may be performed with molten reactants, but it is preferable to use polar organic solvent such, for example, as N-methyl pyrrolidone, dimethylsulfoxide, dimethylacetamide or dimethylformamide.

The last step consists of adding 4-nitrophthalonitrile (3) under such conditions as to effect the nucleophilic substitution of nitrogen-containing groups with ending phenolate groups, resulting in the formation of ether linkages connecting phthalonitrile to the polyaryloxypyridine chains and in the production of oligomeric compositions of formula (1).

The compositions mentioned in this patent application have excellent reaction is conducted at a temperature higher than room temperature and preferably of about 50°–100° C. The nitrogroup, activated by the two nitrile groups, is readily removable and the substitution reaction proceeds under generally milder conditions than with halogen atoms. By use of an aprotic polar organic solvent the reaction can be performed at moderate temperature with excellent yields.

According to another embodiment, the preparation of oligomers compositions of formula (1) may be conducted in four successive steps with separation of the intermediary products.

The first step is the preparation of alkali diphenolate (5), which is used, in a second step, with an excess of dihalogenopyridine (4) to prepare a composition of polyaryloxypyridine oligomers with halogenated end groups corresponding to the general formula:

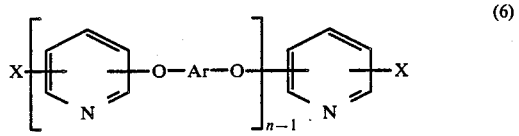

(6)

In this formula Ar, X and n have respectively the same meaning as above indicated.

The molar ratio of dihalogenopyridine (4) to diphenolate (5) is generally about from 1.02/1 to 2/1, so as to obtain compositions of polyaryloxypyridine oligomers with halogenated end groups having a convenient average polycondensation degree: (n−1) from 1 to about 50.

This composition (6) is then reacted, in a third step, with at least one diphenolate (5) molar equivalent per halogenated end group of composition (6), to prepare an oligomeric composition of general formula (2).

The last step is, as precedingly, condensing said product (2) with 4-nitrophthalonitrile (3).

Separately considered, the various reactions leading to the formation of compositions of polyaryloxypyridine oligomers (2) are known: for example, the substitution of activated halogen atoms, i.e., those placed in 2,4,or 6 position of pyridine, with phenolate anions has been disclosed in the French Pat. No. 1,527,714 and in the German Pat. No. 1,934,889. The reactions of substituting activated nitro-groups with various nucleophilic substituents are also known in the prior art. On the contrary, the last step of preparing the oligomers of polyaryloxypyridine α, ω-bis(phthalonitrile) (1), crosslinkable by cyano-addition reaction, was never disclosed before.

The compositions of polyaryloxypyridine with phthalonitrile end groups according to the invention are remarkably soluble in a large number of organic solvents such, for example, as methylene chloride, tetrachloroethane, 1,1,1-trichloroethane, ketones, ethers, amides, ureas, nitriles, dioxane, tetrahydrofuran, etc.

The invention also concerns the conversion of these compositions of polyaryloxypyridine α, ω-bis(phthalonitrile) to lattices of polyaryloxypyridine co-polyphthalocyanines by reaction with benzhydrol derivatives containing one or more orthodinitrile reacting centers. This co-reactant is designed to provide the two hydrogen atoms necessary to convert four phthalonitrile recurrent units to an aromatic phthalocyanine macroring with 18 electrons. The alcohol group of benzhydrol acts as a reducing agent and, during the reaction, is oxidized to a ketone to give a benzophenone derivative. The process of formation of phtalocyanine rings may be represented by way of example, by the following reaction scheme, wherein are shown the phthalonitrile end groups of three molecules of polyaryloxypyridine α, ω-bis(phthalonitrile) and an ortho-dinitrile end group of a benzhydrol derivative.

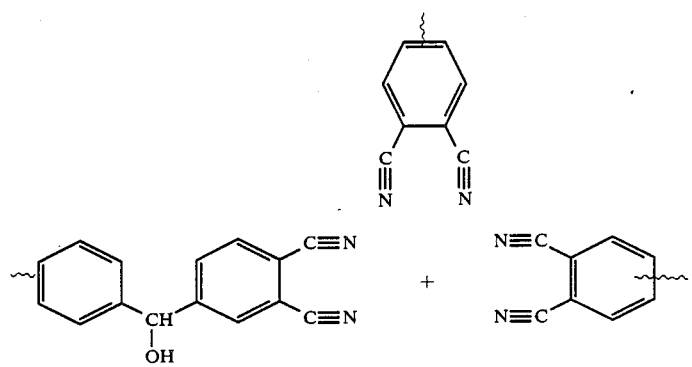

-continued

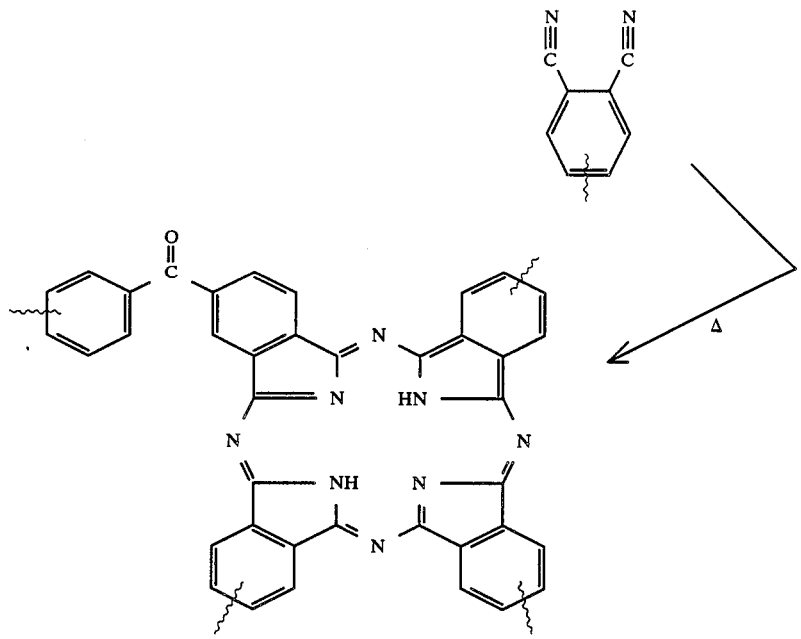

The co-reactant derived from benzhydrol involved in this reaction may comprise, for example, one or two ortho-dinitrile groups; it is then represented by one of the general formulas:

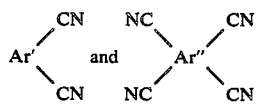 (7)

wherein Ar' is a divalent aromatical radical formed of several fused or interlinked rings as above defined for radical Ar, at least two rings being further linked through a —CHOH— group, the two valences of said radical being on two separate carbon atoms in ortho position of a same ring, and Ar" is a tetravalent aromatic radical formed of several fusedor interlinked rings as above defined for radical Ar, at least two rings being further linked through a —CHOH— group, the four valences of said radical being on separate carbon atoms two by two in ortho position of a same ring.

Examples of co-reactants of general formula (7) advantageously used are 3,4-dicyanobenzhydrol, 3'-phenoxy-3,4-dicyanobenzhydrol, 4'-phenoxy-3,4-dicyanobenzhydrol, 3-(3,4-dicyanophenoxy)-benzhydrol and 4-(3,4-dicyanophenoxy)benzhydrol comprising an ortho-dinitrile functional group, 3,3',4,4' tetracyanobenzhydrol 3,3'-bis(3,4-dicyanophenoxy)benzhydrol, 4,4'-bis (3,4-dicyanophenoxy)benzhydrol, paraphenylenedioxy 3,3'-bis (3,4-dicyanobenzhydrol), paraphenylenedioxy 4,4'-bis(3,4-dicyanobenzhydrol), meta-phenylenedioxy 3,3'-bis(3,4-dicyanobenzhydrol), metaphenylenedioxy 4,4'-bis 3,4-(dicyanobenzhydrol) and 2,6-bis (4-(4-(3,4(dicyanophenoxy) phenylhydroxymethylene)phenoxy) pyridine comprising two ortho-dinitrile functional groups.

The respective proportions of oligomers of general formula (1) and of co-reactants of general formula (7) are so adjusted that the molar percent of the secondary alcohol groups of benzhydrol in proportion to all the ortho-dinitrile groups is from 10 to 50%, preferably from 20 to 30%.

The mixtures formed by compositions of polyaryloxypyridine α, ω-bis (phthalonitrile) (1) and of the coreactant derived from benzhydrol (7) have a softening or melting temperature which, depending on the type of composition, usually range from 30° to 200° C., preferably from 50° to 150° C.

The cross-linking reaction of forming phthalocyanine macrorings is conducted by heating the mixture at a temperature of 180° to 300° C., preferably 200°-250° C.

Depending on the proportions of the various constituents, the gelation time may vary from a few minutes to a few hours and, at the end of the cross-linking reaction, the formed material has a glass transition temperature generally from 150° to 250° C.

By dynamic thermogravimetric analysis it has been determined that these materials have a decomposition threshold in air in the range of about 300° to 500° C.

The invention will be described more precisely in connection with the following specific examples giving details for illustrative purpose but without limiting in any way the scope of the invention.

EXAMPLES

In these examples, the polycondensation reactions are performed under stirring and in an inert atmosphere of nitrogen or argon to avoid any oxidation reaction.

The obtained products are characterized by elemental analysis, infrared spectroscopy, proton and carbon 13 nuclear magnetic resonance, enthalpic differential analysis and steric exclusion chromatography.

Examples 1 to 3 illustrate the method for preparing polyaryloxypyridine oligomers ending with phthalonitrile groups wherein the intermediary products are separated. In examples 4 to 9, the oligomers are prepared without separation of the intermediary products. Other examples, 10 and 11, concern the formation of cross-linked resins of polyaryloxypyridine co-polypthalocyanines.

EXAMPLE 1

A mixture of 59.2 g(0.4 mole) of 2,6-dichloropyridine, 45.6 g (0.2 mole)of 2,2-bis(4-hydroxyphenyl)propane, 41.5 g (0.3 mole) of potassium carbonate 0.1 liter of N-methylpyrrolidone and 0.07 liter of toluene is heated for 5 hours at 130° C. with removal, by azeotropic distillation, of the water formed during the reaction.

Toluene is then distilled and the solution poured in 1 liter of water. The precipitated product is washed with water and dried under reduced pressure. It is purified by recrystallization in a mixture containing 75% by volume of hexane and 25% by volume of toluene. 72 g of a well crystallized white product are obtained, corresponding to a 80% yield, the melting temperature of which is 144° C. This compound is identified, by analysis, as the 2,2-bis(4-(2-chloro 6-pyridyloxy)phenyl)propane formula:

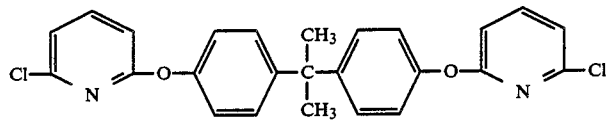

EXAMPLE 2

A mixture of 13.7 g (0.06 mole) of 2,2-bis (4-hydroxyphenyl) propane, 12.4 g (0.09 mole) of potassium carbonate, 0.03 liter of N-methyl pyrrolidone and 0.02 liter of toluene is heated for 4 hours at 120°-130° C. with removal, by azeotropic distillation, of the water formed during the reaction. Toluene is completely distilled off before adding 13.5 g (0.03 mole) of 2,2-bis (4-(2-chloro , 6-pyridyloxy)phenyl) propane prepared as in example 1.

The reaction is continued by heating the reaction mixture at 150° C. for 4 hours. The cooled mixture is poured in a normal sodium hydroxide aqueous solution. The organic impurities are removed by twice extracting with 0.1 liter of ethyl ether. The basic solution is acidified by progressive additition of hydrochloric acid. The formed precipitate is separated by filtration, washed with water up to neutrality and dried at 100° C. under reduced pressure. The product,obtained with 90% yield, may be identified as a polyaryloxypyridine-diphenol corresponding to the formula:

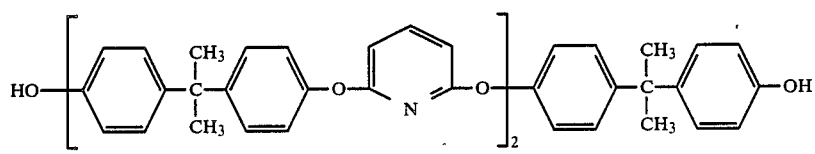

EXAMPLE 3

A mixture of 8.35 g (0.01 mole) of polyaryloxypyridine α, ω-diphenol, prepared as in example 2, with 4.14 g (0.03 mole) of potassium carbonate and 0.03 liter of dimethylsulfoxide is deareated for 30 minutes in argon atmosphere. At.the end of the operation, 3.46 g (0.02 mole) of 4-nitrophthalonitrile are added in a single dose and the mixture is heated at 70° C. for 2 hours. The mixture, after cooling, is poured in a diluted hydrochloric acid aqueous solution. A product is obtained with a yield of 97% (10.5 g) which has a glass transition temperature of 83° C. and whose structure, as shown by analytic methods, is the following:

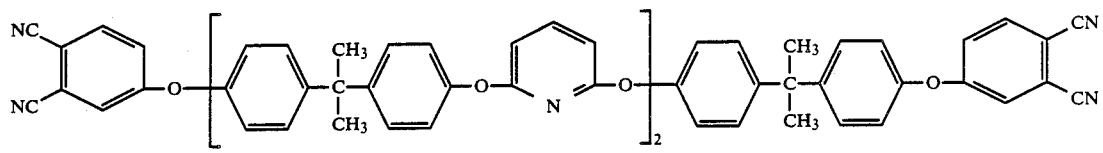

EXAMPLE 4

A reactor of 100 ml capacity is charged with 4.8 g (0.12 mole) of pelletized sodium hydroxide, 5 ml of water, 30 ml of dimethyl sulfoxide and 13.7 g (0.06 mole) of 2,2- bis(4-hydroxyphenyl) propane. The mixture is deaerated for 30 minutes and, after addition of 20 ml of toluene, is progressively heated to 120°-130° C. for one hour with azeotropic distillation of water. Toluene is removed by distillation and then replaced with 20 ml of anhydrous toluene. This operation is repeated once more.

2,6-dichloropyridine(4.44 g ; 0.03 mole) is added to the cooled mixture and, after stirring for a few minutes, the temperature is increased to 150° C. for 3.5 hours. It is then brought back to 70° C. before addition of 10.9 g (0.063 mole) of 4-nitrophthalonitrile and 12.42 g (0.09 mole) of anhydrous potassium carbonate. The reaction is continued at 70° C. for 2 hours.

The reaction product is obtained with a yield of 96% (22.5 g) by precipitation in acidified water, washing and drying. The analysis of this compound indicates a glass transition temperature of 70° C. and a molecular structure corresponding to an oligomer of polyaryloxypyridine α,ω-bis(phthalonitrile) having an average polycondensation degree of 1.

EXAMPLE 5 TO 9

A series of polyaryloxypyridine α, ω-bis(phthalonitrile) of increasing molecular weight and whose average polycondensation degree (PnD) ranges from 2 to 50 is prepared under conditions identical to those described in example 4. The proportions of the different reactants are indicated in the following table:

TABLE

| Example | Weight in grams of | | | | PnD |
|---|---|---|---|---|---|
| | Diphenol[(1)] | Sodium hydroxide | 2,6-Dichloro pyridine | 4-Nitro phthalo-nitrile | |
| 5 | 13.7 | 4.8 | 5.92 | 7.27 | 2 |
| 6 | 13.7 | 4.8 | 7.40 | 3.63 | 5 |
| 7 | 13.7 | 4.8 | 8.07 | 1.99 | 10 |
| 8 | 13.7 | 4.8 | 8.45 | 1.05 | 20 |
| 9 | 13.7 | 4.8 | 8.70 | 0.44 | 50 |

[(1)]2,2-bis(4-hydroxyphenyl)propane.

The products obtained in examples 4 to 9 have the structure of polyaryloxypryridine α,ω-bis(phthalocyanine) which corresponds to the formula:

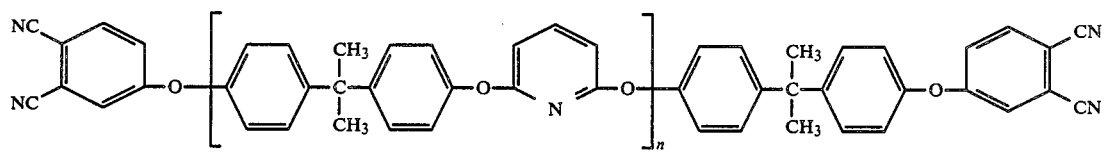

wherein n has the value indicated for PnD.

Example 10

A mixture of 345 mg of polyaryloxypyridine α,ω-bis-(phthalonitrile) having an average poly condensation degree of 2, prepared as described in example 3, which corresponds to about 0.635/1000 ortho-dinitrile groups, with 55 mg of 3,4-dicyanobenzhydrol, i.e., 0.235/1000 hydroxyl groups, wherein the ratio of hydroxyl groups to ortho-dinitrile groups the crushed product has a softening temperature of about 70° C.

The mixture is polymerized for 3 hours at 250° C. in air. The reaction mass quickly turns a green color and its dynamic viscosity in the molten state increases up to gelation. At the end of this treatment the obtained material has a glass transition temperature of 175° C.

EXAMPLE 11

A mixture of 350 mg of polyaryloxypyridine α, ω-bis-(phthalonitrile) having an average polycondensation degree of 1, prepared as described in example 4 (i.e., having 0.894/1000 ortho-dinitrile groups) with 77 mg of 3,4-dicyanobenzhydrol (i.e., having 0.329/1000 hydroxyl groups and a ratio of hydroxyl groups of the ortho-dinitrile groups of 27%) is treated under the conditions of example 10.

Before thermal treatment, the mixture has a softening temperature of 50° C. and, at the end of the heating step at 250° C., it has a glass transition temperature of 210° C.

The final product is subjected to an annealing treatment for one hour at 300° C. to complete the cross-linking reaction. After this treatment, the thermal stability of the material, determined by dynamic thermogravimetric analysis with a temperature increase rate of 10° C. per minute, shows a decomposition threshold of about 415° C.

What is claimed as the invention is:

1. A polyaryloxypyridine oligomers with phthalonitrile end groups, obtained by a process comprising (a) reacting at least one alkali diphenolate with at least one dihalogenopyridine to form a polyaryloxypyridine oligomer having alkali phenolate end groups; and (b) reacting said polyaryloxypyridine oligomer with 4-nitrophthalonitrile to form at least one polyaryloxypyridine oligomer having phthalonitrile end groups.

2. A composition according to claim 1, wherein the reactants proportions correspond to an average polycondensation degree of 1 to 50.

3. A composition according to claim 1, corresponding to the general formula:

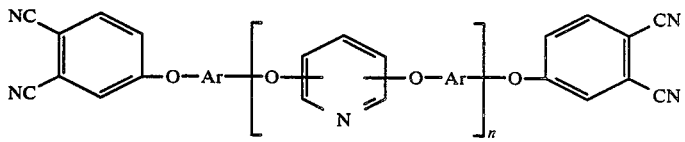

wherein Ar is a divalent carbocyclic or hetero-cyclic aromatic radical, formed of one or more rings, fused or interlinked through a single bond or through an atom or a divalent group, the two valences of said aromatic radical Ar being on two separate carbon atoms, and wherein n is the average polycondensation degree.

4. A composition according to claim 1, wherein said alkali phenolate is derived from a diphenol selected from 1,2-dihydroxybenzene, 1,3-dihydroxybenzene, 1,4-dihydroxybenzene, dihydroxytoluenes, dihydroxyxylenes, dihydroxynaphthalenes, 2,2'-dihydroxybiphenyl, 3,3'-dihydroxybiphenyl, 4,4'-dihydroxybiphenyl, bis(3-hydroxyphenyl)methane, bis(4-hydroxyphenyl)methane, bis(3-hydroxyphenyl)ether, bis(4-hydroxyphenyl)ether, bis(3-hydroxyphenyl)sulfide, bis(4-hydroxyphenyl)sulfide, bis(3-hydroxyphenyl)sulfone, bis(4-hydroxyphenyl)sulfone, bis(3-hydroxyphenyl)sulfoxide, bis(4-hydroxyphenyl)sulfoxide, 3,3'-dihydroxybenzophenone, 4,4'dihydroxybenzophenone, 2,2-bis(4-hydroxyphenyl) propane, 2,2-bis(4-hydroxyphenyl)1,1,1,3,3,3 hexafluoropropane, bis(3-hydroxyphenyl)dimethylsilane, bis(4-hydroxyphenyl)dimethylsilane, 1,3-bis(3-hydroxyphenyl)1,1,3,3-tetramethyldisiloxane, and 1,3-bis(4-hydroxyphenyl)1,1,3,3-tetramethyl disiloxane and wherein said dihalogenopyridine in selected from 2,6-difluoropyridine, 2,6-dichloropyridine, 2,6-dibromopyridine, 2,6-diiodopyridine, 2,4-difluoropyridine, 2,4-dichloropyridine, 2,4-dibromopyridine, 2,4-diiodopyridine.

5. A composition according to claim 1, wherein said alkali diphenolate is derived from 2,2-bis(4-hydroxyphenyl)propane and said dihalogenopyridine is 2,6-dichloropyridine.

6. A process for preparing a composition according to claim 1, comprising a step (a) of preparing an alkali diphenolate by reacting a diphenol with an alkali reactant selected from alkali metals, their hydroxides, their carbonates and their alcoholates, a step (b) of reacting the diphenolate obtained in step (a) with a dihalogenopyridine in molar proportions from 1.02/1 to 2/1, so as to form a composition of polyaryloxypyridine oligomers with alkali phenolate end groups, having an average polycondensation degree of 1 to 50, and a step (c) of reacting the product obtained in step (b) with 4-nitrophthalonitrile in a proportion of 1 to 1.5 nitrogroups per phenolate group.

7. A process for preparing a composition according to claim 1, oomprising a step (a) of preparing an alkali diphenolate by reacting a diphenol with an alkali reactant selected from alkali metals, their hydroxides, their carbonates and their alcoholates, a step (b) of reacting the diphenolate obtained in step (a) with a dihalogenopyridine in molar proportions of dihalogenopyridine to diphenolate from 1.02/1 to 2/1; so as to form a composition of polyaryoxypyridine oligomers with halogenated end groups, having an average polycondensation degree of 1 to 50, a step (b') of reacting the composition obtained in step (b) with diphenolate in a proportion of at least one diphenolate molar equivalent per halogenated end group, so as to form a composition of polyaryloxypyridine oligomers with phenolate end groups having a polycondensation degree of 2 to 50, which is separated, and a step (c) of reacting the product obtained in step (b') with 4-nitrophthalonitrile in a proportion of 1 to 1.5 nitrogroups per phenolate group.

8. A process according to one of claim 6, wherein the reaction of step (c) is performed in an aprotic polar solvent, at a temperature of about 50°-100° C.

9. A method for manufacturing polyaryloxypyridine co-polyphthalocyanine lattices, wherein a composition of polyaryloxypyridine oligomers with phthalonitrile end groups according to claim 1
is subjected to polymerization conditions in the presence of at least one co-reactant derived from benzhydrol and complying with the formula:

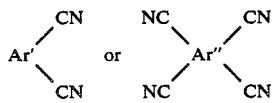

wherein Ar' is a divalent aromatic radical formed of several fused or interlinked rings, at least two rings being linked through a —CHOH— group, the two valences of said radical being on separate carbon atoms in ortho-position of a same ring, and Ar" is a tetravalent aromatic radical formed of several fused or interlinked rings, at least two rings being linked through a —CHOH— group, the four valences of said radical being on separate carbon atoms two by two in ortho position of a same ring, said co-reactant being used in a proportion corresponding to 10-50% of —CHOH — groups with respect to the total number of orthodinitrile groups.

10. A method according to claim 9, wherein said co-reactant derived from benzhydrol is selected from 3,4-dicyanobenzhydrol, 3'phenoxy-3,4-dicyanobenzhydrol, 4'-phenoxy-3,4-dicyanobenzhydrol, 3-(3,4-dicyanophenoxy)-benzhydrol and 4-(3,4-dicyanophenoxy) benzhydrol, comprising one ortho-dinitrile functional group, 3,3',4,4' tetracyanobenzhydrol, 3,3'-bis(3,4-dicyanophenoxy)benzhydrol, paraphenylenedioxy 3,3'-bis(3,4-dicyanobenzhydrol), paraphenylenedioxy 4,4'-bis(3,4-dicyanobenzhydrol), metaphenylenedioxy 3,3'-bis(3,4 dicyanobenzhydrol), metaphenylenedioxy 4,4'-bis 3,4- (dicyanobenzhydrol) and 2,6-bis (4-(4-(3,4dicyanophenoxy)phenylhydroxymethylene)-phenoxy ) pyridine, comprising two ortho-dinitrile functional groups.

11. A polyaryloxypyridine co-polyphthalocyanine lattice obtained by a method according to claim 9.

12. A process according to claim 7, wherein the reaction of step (c) is performed in an aprotic polar solvent, at a temperature of about 50°-100° C.

13. A composition of the formula:

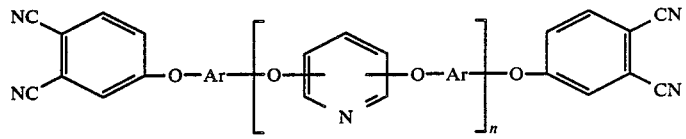

wherein Ar is a divalent carboxylic $C_{5-7}$-carbocylic or $C_{5-7}$heterocyclic aromatic radical wherein the heteroatom is O, N or S, containing one or more rings, fused or interlinked through a single bond, —O—, —S—, —SO—, —SO$_2$—, —CH$_2$—, —C(CH$_3$)$_2$—, —CO—, —CHOH—, —COO—, —CONH—, —Si(CH$_3$)$_2$—, —Si(CH$_3$)$_2$—O—SI(CH$_3$)$_2$—, or a $C_{1-10}$-aliphatic, arylaliphatic or cycloaliphatic radical, the two valences of said aromatic radical Ar being on two separate carbon atoms, and wherein n is the average polycondensation degree.

14. A composition of claim 13, wherein Ar is benzene toluene, xylene, naphthalene, or biphenyl.

15. A composition of claim 13, wherein Ar is the dehydrdoxy radical of bis(hydroxyphenyl)methane, bis-hydroxyphenyl) ether, bis(hydroxyphenyl)sulfide, bis(hydroxyphenyl) sulfone, bis(hydroxyphenyl)sulfoxide, benzophenone, bis(hydroxyphenyl)propane, bis(hydroxyphenyl)hexafluoroproane, bis(hydroxyphenyl)-dimethylsilane or bis(hydroxyphenyl) tetramethyldisiloxane.

* * * * *